United States Patent [19]

Mitzel

[11] 4,310,152
[45] Jan. 12, 1982

[54] STACKER FOR FLAT MATERIAL

[75] Inventor: Wilhelm Mitzel, Neukeferloh, Fed. Rep. of Germany

[73] Assignee: GAO Gesellschaft für Automation und Organisation mbH, Munich, Fed. Rep. of Germany

[21] Appl. No.: 50,979

[22] Filed: Jun. 22, 1979

[30] Foreign Application Priority Data

Mar. 13, 1979 [DE] Fed. Rep. of Germany ....... 2909833

[51] Int. Cl.³ .......................................... B65H 29/00
[52] U.S. Cl. ................................... 271/186; 271/195; 271/196; 271/215; 271/309
[58] Field of Search ................ 271/DIG. 2, 186, 195, 271/196, 197, 215, 309, 194

[56] References Cited

U.S. PATENT DOCUMENTS

| 1,991,511 | 2/1935 | Lyman | 271/186 UX |
| 2,759,543 | 8/1956 | Conti | 271/194 X |
| 2,931,647 | 4/1960 | Papa | 271/195 |
| 3,618,935 | 11/1971 | Howatt | 271/195 |
| 3,675,522 | 7/1972 | Hull | 271/196 X |
| 3,729,188 | 4/1973 | Stephenson | 271/186 X |
| 3,840,222 | 10/1974 | Fowlie | 271/186 X |
| 4,027,580 | 6/1977 | Sundin | 271/186 X |
| 4,116,430 | 9/1978 | Winchester | 271/196 X |

Primary Examiner—Richard A. Schacher
Attorney, Agent, or Firm—Andrus, Sceales, Starke & Sawall

[57] ABSTRACT

A stacker for sheet material has a stacker drum. The stacker drum receives sheets from a transport system at a first tangential position and arcuately moves them to a stop at a second tangential position against which the stack is formed. The stacker drum has a row of suction openings for gripping the leading edge of the sheets followed by compressed air openings. The compressed air openings are positioned behind the suction openings sufficiently far so that the compressed air is applied to the sheets only after the leading edges have been run up against the stop.

12 Claims, 7 Drawing Figures

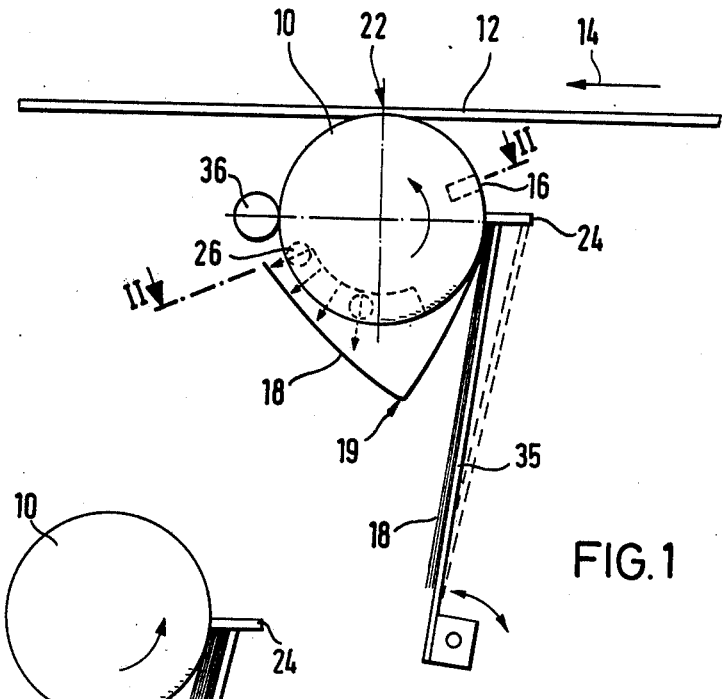
FIG.1
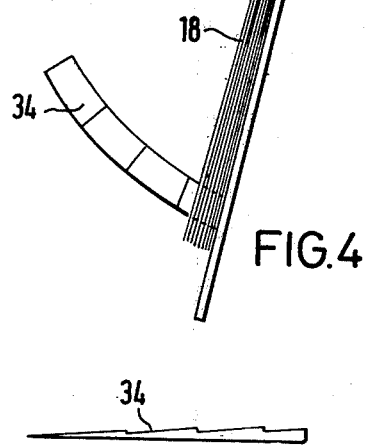
FIG.4
FIG.5
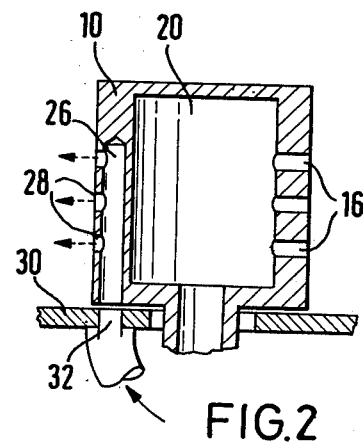
FIG.2

STACKER FOR FLAT MATERIAL

BACKGROUND OF THE INVENTION

The invention relates to a stacker for flat material such as banknotes, bankpapers and the like, with a stacker drum vertically bearinged on a base plate and with a belt transport system placed tangentially with respect to the stacker drum, and the stacker drum is designed for taking up the material, using a line of suction openings, at its leading edge and, on being turned, for pulling the material out of the transport system and, after moving through a certain angle of turning, stacking it against a stopper, and in which the material is acted upon by compressed air, through blowing openings, placed after the suction openings in the direction of turning, for bending the material away from the drum before being stacked.

In the case of stackers of this design, that is to say stackers in which the sheet material is taken from the transport system by a turning stacker drum, by which it is guided up against its stopper and stacked at this position, there is, more specially in the case of high stacking speeds, a shortcoming with respect to full clearing of the back face part: the sheets placed on the roller have the tendency, after the leading edge has come up against the stopper, of slipping tangentially along the outer drum or roller face, something which in the end is responsible for folding the sheet material, generally near its middle line, so that the sheet is stacked in a folded or crumpled condition. The outcome of this is that the stack produced is unorderly and in some cases further stacking may be stopped. This effect is to be seen specially frequently in the case of long sheets which as such are not of a stiff nature, as will be the case, for example, with much used banknotes.

For putting an end to this shortcoming there has been a suggestion, see for example the German Offenlegungsschrift specification No. 2,555,306, to have a blowing nozzle on the stacker drum producing an air jet tangentially in the direction of turning of the drum. As the trailing or back edge of the sheet taken up by the stacker drum is moved past the nozzle, air is to be run inbetween the transported sheet material and the drum, so that the sheet is cleared or lifted from the drum outer face by the building up of static pressure in operation of the stacker. It has, however, turned out to be the case that, because the trailing edge of the sheet is not moved clear of the drum outer face to the necessary degree, it is hardly ever possible for air to get into the space between the drum outer face and the sheet and, in fact, the only effect of the air current is the frequent folding of the sheet material along its middle line, something which, as noted beforehand, may be responsible for unorderly stacking and the stopping of the stacking work.

In the U.S. Pat. No. 2,759,543, a suggestion has been made for a stacker in the case of which, in place of an outside air blowing nozzle, placed beside the stacker drum, the blowing air goes from the inside of the drum through separate blowing nozzles. In the direction of turning of the drum the blowing openings are placed after the suction openings used for gripping the front or leading edge of the sheet. But for the leading edge part of the sheet itself, an air cushion is formed between the sheet and the drum as the sheet material is moved round on the drum, something which makes it more readily possible for the sheets to be cleared or stretched out before coming to the clearing stopper. Because of the blowing openings, which are placed generally near and behind the suction openings, however, more specially in the case of long and much used sheets, the middle part will be lifted clear of the drum while the trailing edge is still kept sticking to the outer face of the stacker drum. A further shortcoming in the case of this stacker is the complex control system and design of the blowing and suction openings, with which trouble in operation is frequently likely. Because each opening inside the drum has its own pressure or, in the other case, vacuum chamber, it is only possible for a limited number of openings to be placed along the length of the drum, so that the taking up the sheets by the drum becomes uncertain.

SUMMARY OF THE PRESENT INVENTION

One purpose of the present invention is that of designing a stacker of the sort noted, in the case of which the stacker drum is vertically placed over a base plate and there is the desired, full lifting of the material from the drum and bending into the stretched position, when the leading edge comes up against the clearing stopper. More specially in the case of sheet material, which is long in comparison with the diameter of the stacker drum, the freeing of the material from the drum so as to go on to the stack is to be possible at a high rate or frequency and without any shortcomings on operation. In this respect the design is to be simpler and more trouble-free when running than is the case with old systems.

For effecting these and other purposes there are the measures of the invention that the blowing openings are placed so far behind the suction openings that, dependent on the length of the sheet material, a certain part in the back half of the sheet material is acted upon by blowing air and the blowing out of air from the blowing openings takes place only after the leading edge has run up against the stopper. With this system it is possible, in a surprisingly simple way, to make certain that, in a fixed relation to a certain angle position of the drum, the back part of the sheet material, which at the time is on the drum, for example, of a banknote, is cleared from the drum, and, without causing any bending or crumpling is moved into a stretched position in relation to the drum. The stacking of the banknote takes place in the desired way without any shortcomings. Because banknotes or other bankpapers are to be stacked which are different in length, the blowing openings are preferably placed over a certain angle range of the drum.

It has turned out to be of good effect if the blowing of air is only started after the leading edge of the sheet material has come up against the clearing stopper. For effecting this purpose, in one further development of the invention of good effect, the air goes to the blowing openings from one or more unmoving pressure chambers, which are placed stretching over a certain angle range and over which the blowing openings are moved, the blowing range, as depending on the pressure chambers, having its start at a distance from the clearing unit which is equal to the length of the shortest sheet material to be stacked, that is to say the material for which the stacker is designed.

More specially in the case of long sheet material, it is necessary to make certain that the trailing edge is not kept sticking to the drum. For this purpose, in a preferred form of the invention, a weighting roller is placed on the drum at a position before the start of the blowing range in the direction of turning of the drum, the weighting roller being responsible for moving the back half, or second half, of the sheet material on further, after the leading edge has been stopped by the stopper. In this case the clearing of the sheet material is not only undertaken by the blowing air itself, but is in fact as well caused by a locking effect, as it were. The weighting roller is in this respect placed a distance in front of the blowing range, which is equal to about half the angle range taken up by the blowing openings. With this system it is possible to make certain that the weighting roller comes into effect, more specially, in the case of long banknotes.

A system of the pressure chamber and for controlling the blowing air, which is of specially simple design, is detailed in the dependent claims 6 and 7.

In one further development of the invention of good effect the base plate may be made lower around and in relation to the stacker drum at the position of bending out of the transported material away from the drum, more specially in the case of banknotes, so that the lower edge of a banknote does not come against the base plate on bending, and near the trailing edge of the stretched out banknote there is a guide rail sloping smoothly up to the level of the lower edge of the banknote. This design makes it possible to make certain that the lower edges of the banknotes are not forced along the base plate, something which would have the tendency of stopping the stretching out or bending, and the guide rail, placed at the position of bending, makes certain that the banknote is not turned back out of control. For stopping any unnecessary opposite force on sliding, the guide rail is, more specially, made with a curved form, its radius being dependent on the average bending radius of the banknote or other material to be transported.

For stopping any fanning out in a backward direction, the top side of the guide rail is made with sawteeth. It has turned out to be best if this part of the base plate is lowered about 2 to 3 mm below the normal level of the base plate.

BRIEF DESCRIPTION OF THE DRAWING

An account will now be given of one working example of the invention making use of the accompanying figures.

FIG. 1 is a diagrammatic view of the stacker drum of a stacker.

FIG. 2 is a diagrammatic cross-section through the stacker drum and the base plate taken along the line II—II of FIG. 1.

FIG. 4 is a diagrammatic view looking down on to the stacker drum and a guide rail.

FIG. 5 is a side view of the guide rail.

DETAILED DESCRIPTION OF THE PREFERRED EMBODIMENT

Figure 3C:
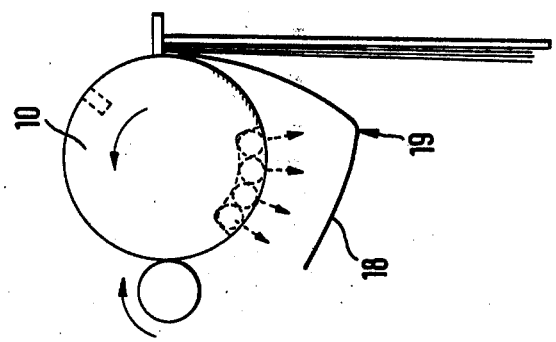
FIGS. 3a to 3c are diagrammatic views of the stacker drum in three different stages of stacking.

In FIG. 1 only the stacker drum 10 is presented diagrammatically and details of the system generally are not given. The stacker itself is normally one unit of a system for the automatic processing of sheet material, as for example banknotes. The belt transport system 12 is only marked by a double line. It has a number of transport rollers, guide rollers and pairs of belts, which, however, are not part of the present invention. In the present connection the only important fact is that the banknotes are run in the direction of the arrow 14 to the stacker drum 10 running at the same speed as, that is to say synchronously with respect to, the belt transport system 12. The spacing of the separate banknotes is so fixed and so timed that, with the drum turning smoothly, the suction openings 16, placed in a line one above the other in the drum 10, are completely covered by the front or leading edge of each banknote. In the working example of the invention viewed, the stacker drum 10 is designed as a hollow cylindrical body with a generally thick wall and which is supported on a base plate by the necessary bearing system. The banknotes 18 are, for this, transported through a system on edge, in an upright position (see FIG. 2).

The inner space 20 of the stacker drum 10 is joined by way of a timing valve plate (not shown in the figure) with a vacuum space. The vacuum in the space 20 of the drum 10 is in this respect so controlled that, starting from the position 22, at which the banknote 18 is suction-gripped, is kept up all the time in the direction of turning through about 270°. Shortly before the stopper 24, the suction opening 16 is cut off from the vacuum, so that the banknotes 18 may readily be cleared from the drum by the stopper 24.

The control of the vacuum, which is present at the suction openings 16, may naturally be effected in some other way and not in the way given in the figure, for example, by using a valve plate in the form of a stator with certain sectors, and on which the drum, acting as a rotor, is bearinged.

In one range or part of the cylinder casing of the drum 10, which is about 100° to 180° after the suction opening 16 in the direction of turning, some air chambers 26 are placed one after the other. These air chambers are in the form of blind holes machined into the drum 10 from one end face. The chambers 26 are joined with the outside atmosphere, by way of blowing openings 28 and at their lower ends, that is to say at the ends at the base plate 30, they are open.

On the radius of the air chambers 26 in the base plate there is an opening 32, which is joined with a compressed air line. The opening 32 is placed in the base plate 30 under the air chambers 26, marked in broken lines, in FIG. 1, while in FIGS. 3a to 3c it is, as well, marked with a lead line. The space between the top side of the baseplate 30 and the lower face of the drum 10 is so small that no marked loss in pressure takes place.

When the chambers 26 (that is to say, their lower openings) are moved over the opening 32, the chambers 26 get their compressed air and are responsible for blowing the necessary air current against the inner face of the banknote 18, which is being moved by the stacker drum 10 towards the stopper 24. When this is done, the lower face of the banknote is cleared from the face of the drum 10. An effect more specially produced is that the banknote 18 is not folded up at the fold line 19, something which would make it hard for the next banknotes to be stacked in an orderly way.

Figure 3B:
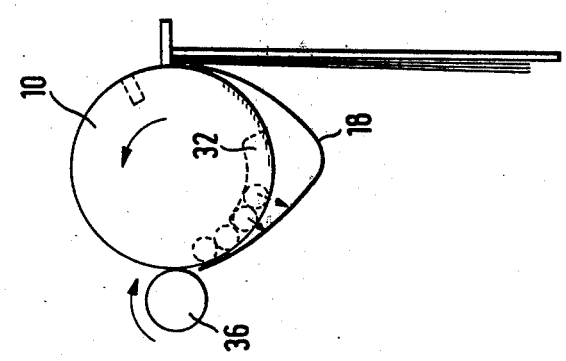
Figure 3A:
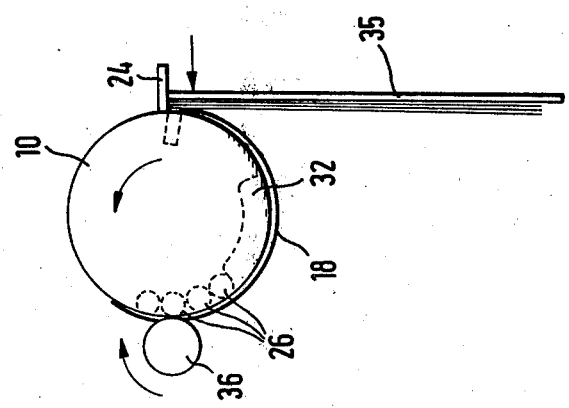

FIGS. 3a and 3c are views of different stages of the stacking operation. The banknote has such a length that on casing of the stacker drum it takes up an angle of about 180°.

In the stage viewed in FIG. 3a, the leading edge of the banknote 18 is coming up against the stopper 24, the suction air is turned off and the leading edge of the banknote 18 is gripped by way of a pusher plate 35. The back part of the banknote 18 is forced by the weighting roller 36 against the outer face of the suction drum and transported on further by friction. At this point in time, that one of the air chambers 26 which is furthest to the front comes up over the outlet opening 32 so that it takes up compressed air and by way of the blowing openings 28 is responsible for blowing air into the space between the banknote 18 and the drum face. On further turning of the drum 10, a stage comes into being, as is to be seen in FIG. 3b, in which two chambers 26 are at the blowing opening 32 and the banknote 18 has been so pushed on further from the weighting roller 36 that its trailing edge is freed. Because of the building up of pressure at this time between the banknote 18 and the drum face there is a further effect clearing the banknote 18, which lastly comes into the position to be seen in FIG. 3c, in which the blowing air current from all air chambers is towards the back part of the note. The fold line 19 does not, in this respect, make for any great folding effect.

The angle range, over which the air chambers 26 and their blowing openings 28 are placed, and the angle range, along which the outlet opening 32 takes up, are so designed in relation to each other that even in the case of the shortest sheet material to be sorted, the clearing by blowing of the back part of the banknote is only started when the leading edge of the sheet has come up against stopper 24.

In the case of the working example of the invention to be seen in FIGS. 3a to 3c, the drum has, for example, an outer diameter of 80 cm and in this respect the air chambers 26 are placed in a range from 120° to 180°, starting at the suction opening 16, in a clockwise direction. The outlet opening 32 takes up an angle range of about 80° to 135°, this, as well, being clockwise in direction starting at the stopper 24. The weighting roller is placed truly opposite the stopper 24 and, on stacking long banknotes, is responsible for pushing the back part of the notes mechanically further on, so helping the function of the blowing openings 28.

On bending of the banknotes outwards away from the drum, it may be, with an upright position of the stacker drum 10, that the lower edge of the banknote 18 is forced along the base plate 30, is bent inwards somewhat and has the effect stopping any smooth stretching or bending out of the banknote into the straight position. For getting around this shortcoming, it is possible for the base plate to be lowered by 2 or 3 mm at the position where the stretching out of the banknote takes place, so that the lower edge of the banknote 18 no longer is forced against the base plate 30. For stopping any uncontrolled folding or turning of the banknote near the trailing edge of the stretched out banknote 18 a guide rail 34 is placed having a saw-tooth outline (see FIG. 4) and running in steps up to the level of the lower edge in the direction of stretching out of the banknote. By the use together of the lowered base plate 30 with the curved guide rail 34 any forcing along of the banknote at its lower edge is stopped and the stretching out operation is made more readily possible.

The saw-tooth outline has the effect of stopping any fanning again of the banknotes in the stack so far formed.

In the working example of the invention in the figures it will be seen that, when looked at from bove, the guide rail is somewhat curved, its radius being the same as the average radius of bending out of banknotes on going into the straight position. For this reason, it is in all cases the same part of the lower edge of the banknotes which comes up against the guide rail 34 and the resistance of the rail is decreased to the lowest possible value. Naturally other forms of the guide rail may be used.

I claim:

1. A stacker for flat material sheets, said stacker having a rotatable stacker drum for tangentially receiving sheets of material from a sheet transport system at a first tangential position and arcuately moving the sheets to a stop at a second tangential position against which a stack is formed, said stacker drum having suction opening means at a predetermined location on the periphery thereof for gripping the leading edges of the sheets at said first tangential position and releasing said sheets at said second tangential position, said stacker drum having air opening means on the periphery thereof positioned behind said suction opening means in the direction of rotation by an amount such that compressed air may be supplied to said air openings and the sheets only after the leading edges thereof have been run up against the stop, said stacker drum having air chamber means parallel to the axis thereof which is joined with air openings on the exterior of the drum, said air chamber means having an inlet opening on an end face of the drum opposite a base plate and alignable with the outlet of pressure chamber means in the base plate dependent on the angle of turning of said stacker drum so that compressed air is supplied to said air chamber means.

2. A stacker as claimed in claim 1, characterised in that the chambers (26) are blind holes running in from the end face of the drum (10).

3. A stacker for flat material sheets, said stacker having a rotatable stacker drum for tangentially receiving sheets of material from a sheet transport system at a first tangential position and arcuately moving the sheets to a stop at a second tangential position against which a stack is formed, said stacker drum having suction opening means at a predetermined location on the periphery thereof for gripping the leading edges of the sheets at said first tangential position and releasing said sheets at said second tangential position, said stacker drum having air opening means on the periphery thereof positioned behind said suction openings in the direction of rotation by an amount such that compressed air may be supplied to said air openings and to the sheets only after the leading edges thereof have been run up against the stop, said stacker having a weighting roller located ahead of the arcuate position at which compressed air is supplied in the direction of rotation, said weighting roller being biased toward said stacker drum for further moving the back half of the sheet material after the leading edge has been stopped at said stop.

4. A stacker as claimed in claim 3 wherein the weighting roller is located ahead of the arcuate position at which compressed air is supplied by an amount equal to about half the peripheral portion occupied by said air opening means.

5. A stacker for flat material sheets, said stacker having a rotatable stacker drum for tangentially receiving sheets of material from a sheet transport system at a first tangential position and arcuately moving the sheets to a stop at a second tangential position against which a stack is formed, said stacker drum having suction opening means at a predetermined location on the periphery thereof for gripping the leading edges of the sheets at said first tangential position and releasing said sheets at said second tangential position, said stacker drum having air opening means on the periphery thereof positioned behind said suction opening means in the direction of rotation by an amount such that compressed air may be supplied to said air openings and to the sheets only after the leading edges thereof have been run up against the stop, said stacker drum extending above a base plate and wherein at the position in which the sheet material is bent away from the stacker drum by said air opening means, said base plate is lowered by an amount such that the lower edge of the material sheet does not contact the base plate, said stacker including a guide rail for receiving the trailing edge of the sheet material blown from the drum, said guide rails sloping from the base plate to the level of the lower edges of the sheet material.

6. A stacker as claimed in claim 5, characterised in that the guide rail (34) is curved and has a radius equal to the average bending radius of the banknotes on being bent out into the straight portion.

7. A stacker as claimed in claim 5 or claim 6, characterised in that the top side of the rail (34) has saw-teeth.

8. A stacker as claimed in anyone of claims 5 or 6, characterised in that the base plate is lowered by 2 to 3 mm at the position at which the banknotes are bent out away from the drum.

9. A stacker according to claim 1, 3 or 5 wherein said air opening means occupies a predetermined portion of the periphery of said stacker drum.

10. A stacker as claimed in claim 9 further defined as including stationary compressed air chamber means communicating with said air opening means as said stacker drum rotates, said chamber means being positioned with respect to air opening means such that it commences the supply of compressed air at a predetermined peripheral distance from said stop.

11. A stacker as claimed in claim 1, 3, or 5 wherein said air opening means provides increasing amounts of compressed air as said stacker drum rotates.

12. A stacker as claimed in claim 11 wherein said air opening means provides step-wise increasing amounts of compressed air.

* * * * *